Patented Mar. 21, 1939

2,151,047

UNITED STATES PATENT OFFICE 2,151,047

PIPERIDINE COMPOUND

Ernst Preiswerk, Munchenstein, near Basel, and Otto Schnider, Basel, Switzerland, assignors to Hoffmann-La Roche Inc., Nutley, N. J., a corporation of New Jersey No Drawing. Application June 29, 1938, Serial No. 216,624

5 Claims. (Cl. 260—293)

This invention relates to a new class of compounds which may be designated as the di- or tri-alkyl substituted 2,4-dioxo-piperidines having the following general formula:

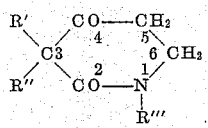

wherein R' and R'' represent alkyl radicals which may be the same or different, and R''' represents either hydrogen or alkyl radicals.

These compounds are prepared by the hydrogenation, preferably catalytic, of compounds having the following general formula:

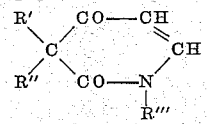

in which R' and R'' represent saturated or unsaturated alkyl radicals which may be the same or different, and R''' may be hydrogen or alkyl. Such starting materials are prepared in accordance with the processes disclosed in United States Patent No. 2,090,068, and German Patent No. 637,385. When the starting materials contain unsaturated alkyl groups these are hydrogenated simultaneously with the hydrogenation of the carbon atoms of the nucleus.

The new compounds are colorless compounds which may either be oily or solid. Their solubility in water is greater than that of the corresponding starting material, some of them being very easily dissolved in water. Generally the new compounds are easily soluble in organic solvents. Some of them may be distilled under vacuum without decomposition.

The new compounds induce sleep as do the starting materials, but their action differs from that of the corresponding starting materials in that the sleep induced thereby lasts longer and that the sleep is a little deeper.

The following examples serve to illustrate the new class of compounds by way of specific example, but the invention is in no way limited thereby.

Example 1

167 parts by weight of 2,4-dioxo-3,3-diethyl-tetrahydropyridine are dissolved in 600 parts by weight of methanol. This solution is hydrogenated in the presence of a palladium catalyst which consists of 1 part by weight of finely divided metallic palladium precipitated on 9 parts by weight of decolorising charcoal, at a gauge pressure of about ⅕ atmosphere and room temperature with thorough agitation. After a short time 2 parts by weight of hydrogen are assimilated. The resulting solution is separated from the catalyst by filtration and the methanol is distilled off, leaving 2,4-dioxo-3,3-diethyl-piperidine. The product is then recrystallized from a mixture of benzol and petroleum ether. The pure product has a melting point of 104°–105° C. and is quite easily dissolved in water.

Example 2

A solution of 209 parts by weight of 1-methyl-2,4-dioxo-3,3-di-n-propyl-tetrahydropyridine in 520 parts of alcohol is mixed with a nickel catalyst which contains 15 parts by weight of nickel and which is prepared in accordance with the instructions given in "Berichte der Deutschen Chemischen Gesellschaft", vol. 49 (1916) pages 55 and 60. This mixture is hydrogenated at 80° C. and 15 atmospheres pressure. The assimilation of hydrogen ceases after a few minutes. The pure product 1-methyl-2,4-dioxo-3,3-di-n-propyl-piperidine is obtained by filtering off the catalyst, distilling off the solvent, and then distilling off the product at about 14 mm. pressure and at temperatures between 157° C. and 159° C. The oily substance which distills off crystallizes into a mass melting at 41–42° C.

Example 3

A solution of 181 parts by weight of 1-methyl-2,4-dioxo-3,3-diethyl-tetrahydropyridine in 420 parts by weight of methanol is hydrogenated in the presence of a palladium catalyst as described in Example 1. The 1-methyl-2,4-dioxo-3,3-diethyl-piperidine, which is obtained, is fluid at room temperatures and may be distilled at reduced pressure (boiling point at about 14 mm. being 145–146° C.). The product is also very easily dissolved in water.

Example 4

207 parts by weight of 1-allyl-2,4-dioxo-3,3-diethyl-tetrahydropyridine are dissolved in 730 parts by weight of methanol. 8 parts by weight of decolorising charcoal and sufficient 10% palladium chloride solution to produce 0.8 part by weight of palladium metal are introduced into this solution. This mixture is shaken in a hydrogen atmosphere at a pressure of 1 1/10 atmospheres, and after one hour the hydrogen assimilation ceases. The amount of hydrogen assimilated corresponds exactly to 4 atoms of hydrogen for every molecule of the starting material. The product 1-propyl-2,4-dioxo-3,3-diethyl-piperidine boils at 164 to 165° C. under approximately 14 mm. pressure and is an odorless nonsolidifying oil.

Other compounds such as 2,4-dioxo-3,3-di-n-propyl-piperidine, 2,4-dioxo-3,3-n-butyl-n-propyl-piperidine, 2,4-dioxo-3,3-n-butyl-ethyl-piperidine, and 2,4-dioxo-3,3-isopropyl-n-propyl-piperidine may be obtained by the hydrogenation of the corresponding tetrahydropyridine compound by methods such as described in the preceding examples.

We claim:
1. A compound of the general formula

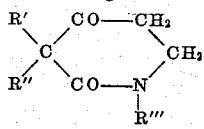

wherein R' and R'' represent lower unsubstituted saturated alkyl radicals and R''' is selected from the group consisting of hydrogen and lower unsubstituted saturated alkyl radicals.

2. A compound of the general formula

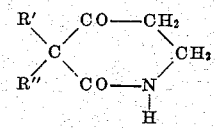

wherein R' and R'' represent lower unsubstituted saturated alkyl radicals.

3. 2,4-dioxo-3,3-diethyl-piperidine.
4. 1-methyl-2,4-dioxo-3,3-di-n-propyl-piperidine.
5. 1-methyl-2,4-dioxo-3,3-diethyl-piperidine.

ERNST PREISWERK.
OTTO SCHNIDER.